United States Patent
Pinarbasi (10) Patent No.: US 6,820,322 B2
(45) Date of Patent: Nov. 23, 2004

(54) METHOD OF MAKING A SPIN VALVE SENSOR WITH A FREE LAYER STRUCTURE SPUTTER DEPOSITED IN A NITROGEN ATMOSPHERE

(75) Inventor: Mustafa Pinarbasi, Morgan Hill, CA (US)

(73) Assignee: Hitachi Global Storage Technologies Netherlands B.V., Amsterdam (NL)

(*) Notice: Subject to any disclaimer, the term of this patent is extended or adjusted under 35 U.S.C. 154(b) by 425 days.

(21) Appl. No.: 09/873,005

(22) Filed: May 31, 2001

(65) Prior Publication Data

US 2002/0181172 A1 Dec. 5, 2002

(51) Int. Cl.[7] .......................... G11B 5/127; G11B 5/39
(52) U.S. Cl. ................... 29/603.14; 360/324.1
(58) Field of Search .................. 29/603.07, 603.14; 360/324.1, 324.2

(56) References Cited

U.S. PATENT DOCUMENTS

| | | | |
|---|---|---|---|
| 5,997,698 A | 12/1999 | Mino et al. | 204/192.2 |
| 6,023,397 A | 2/2000 | Mino et al. | 360/126 |
| 6,452,204 B1 * | 9/2002 | Ishiwata et al. | 257/9 |
| 6,657,828 B2 * | 12/2003 | Araki et al. | 360/324.1 |

FOREIGN PATENT DOCUMENTS

| | | |
|---|---|---|
| JP | 9050609 | 2/1997 |
| JP | 10294217 | 11/1998 |

OTHER PUBLICATIONS

*IEEE Trans.* vol. 32, No. 5, pt. 1, p. 3368–73, Sep. 1996, "Spin–valve read heads with . . . ".

* cited by examiner

*Primary Examiner*—George J. Letscher
(74) *Attorney, Agent, or Firm*—Ervin F. Johnston (57) ABSTRACT

A method makes a spin valve sensor of a magnetic read head which includes the steps of forming a ferromagnetic pinned layer structure that has a magnetic moment, forming a pinning layer exchange coupled to the pinned layer structure for pinning the magnetic moment of the pinned layer structure, forming a free layer structure, forming a nonmagnetic electrically conductive spacer layer between the free layer and the pinned layer structure and the forming of the free layer structure including the step of sputter depositing at least a first free layer composed of cobalt iron directly on the spacer layer in a nitrogen atmosphere.

13 Claims, 6 Drawing Sheets

FIG. 9
(ABS)

METHOD OF MAKING A SPIN VALVE SENSOR WITH A FREE LAYER STRUCTURE SPUTTER DEPOSITED IN A NITROGEN ATMOSPHERE

BACKGROUND OF THE INVENTION

1. Field of the Invention

The present invention relates to a method of making a spin valve sensor with a free layer structure sputter deposited in a nitrogen atmosphere and, more particularly, to such a method which results in the free layer structure having a reduced uniaxial anisotropy ($H_K$).

2. Description of the Related Art

The heart of a computer is a magnetic disk drive which includes a rotating magnetic disk, a slider that has read and write heads, a suspension arm above the rotating disk and an actuator arm that swings the suspension arm to place the read and write heads over selected circular tracks on the rotating disk. The suspension arm biases the slider into contact with the surface of the disk when the disk is not rotating but, when the disk rotates, air is swirled by the rotating disk adjacent an air bearing surface (ABS) of the slider causing the slider to ride on an air bearing a slight distance from the surface of the rotating disk. When the slider rides on the air bearing the write and read heads are employed for writing magnetic impressions to and reading magnetic signal fields from the rotating disk. The read and write heads are connected to processing circuitry that operates according to a computer program to implement the writing and reading functions.

An exemplary high performance read head employs a spin valve sensor for sensing the magnetic signal fields from the rotating magnetic disk. The sensor includes a nonmagnetic electrically conductive first spacer layer sandwiched between a ferromagnetic pinned layer structure and a ferromagnetic free layer structure. An antiferromagnetic pinning layer interfaces the pinned layer structure for pinning a magnetic moment of the pinned layer structure 90° to an air bearing surface (ABS) wherein the ABS is an exposed surface of the sensor that faces the magnetic disk. First and second leads are connected to the spin valve sensor for conducting a sense current therethrough. A magnetic moment of the free layer structure is free to rotate upwardly and downwardly with respect to the ABS from a quiescent or bias point position in response to positive and negative magnetic field signals from a rotating magnetic disk. The quiescent position, which is parallel to the ABS, is the position of the magnetic moment of the free layer structure with the sense current conducted through the sensor in the absence of signal fields.

The thickness of the spacer layer is chosen so that shunting of the sense current and a magnetic coupling between the free and pinned layer structures are minimized. This thickness is typically less than the mean free path of electrons conducted through the sensor. With this arrangement, a portion of the conduction electrons are scattered at the interfaces of the spacer layer with the pinned and free layer structures. When the magnetic moments of the pinned and free layer structures are parallel with respect to one another scattering is minimal and when their magnetic moments are antiparallel scattering is maximized. Changes in scattering changes the resistance of the spin valve sensor as a function of cos θ, where θ is the angle between the magnetic moments of the pinned and free layer structures. The sensitivity of the sensor is quantified as magnetoresistive coefficient dr/R where dr is the change in the resistance of the sensor as the magnetic moment of the free layer structure rotates from a position parallel with respect to the magnetic moment of the pinned layer structure to an antiparallel position with respect thereto and R is the resistance of the sensor when the magnetic moments are parallel.

In addition to the spin valve sensor the read head includes nonconductive nonmagnetic first and second read gap layers and ferromagnetic first and second shield layers. The spin valve sensor is located between the first and second read gap layers and the first and second read gap layers are located between the first and second shield layers. In the construction of the read head the first shield layer is formed first followed by formation of the first read gap layer, the spin valve sensor, the second read gap layer and the second shield layer. Spin valve sensors are classified as a top or a bottom spin valve sensor depending upon whether the pinning layer is located near the bottom of the sensor close to the first read gap layer or near the top of the sensor close to the second read gap layer. Spin valve sensors are further classified as simple pinned or antiparallel pinned depending upon whether the pinned layer structure is one or more ferromagnetic layers with a unidirectional magnetic moment or a pair of ferromagnetic layers that are separated by a coupling layer with magnetic moments of the ferromagnetic layers being antiparallel. Spin valve sensors are still further classified as single or dual wherein a single spin valve sensor employs only one pinned layer and a dual spin valve sensor employs two pinned layers with the free layer structure located therebetween.

The free layer structure typically employs a nickel iron layer which provides a desirable magnetic softness for the free layer. This means that the free layer has a low uniaxial anisotropy $H_K$ which promotes responsiveness of the free layer structure to signal fields from a rotating magnetic disk. When the free layer structure is highly responsive a small signal field will rotate the magnetic moment of the free layer structure which causes a change in the magnetoresistance of the spin valve sensor. It has been found that when the free layer structure also includes a cobalt iron or cobalt layer, sometimes referred to as a nanolayer, between the nickel iron layer and the spacer layer and interfacing the spacer layer that the magnetoresistance or magnetoresistive coefficient dr/R is improved. In order to obtain a desirable increase in the magnetoresistive coefficient dr/R, it has been further found that the thickness of the cobalt iron or cobalt layer should be on the order of 15 Å. Unfortunately, any increase in the thickness of the cobalt iron layer reduces the softness of the free layer structure so that it is not as responsive to signal fields from the rotating magnetic disk.

The areal density of a read head is the product of linear bit density and track width density. Linear bit density is quantified as bits per inch (BPI) along the track of the disk and track width density is quantified as tracks per inch (TPI) along the radius of the disk. An increase in the areal density equates to increased storage capacity of a computer which has progressed from kilobytes to megabytes to gigabytes.

The linear bit density is increased by increasing the number of bits per inch along the tracks of the rotating magnetic disk. When this occurs, each bit from the disk produces a lower magnetic field which must be sensed by the spin valve sensor. In order to meet this objective the free layer of the spin valve sensor must be more sensitive to the reduced fields from the smaller bits along the tracks of the rotating magnetic disk. This means that the magnetic moment of the free layer must be reduced so that it is less stiff in its response to the field from the bits of the rotating disk. This has been accomplished by reducing the thickness of the nickel iron layer in the free layer structure so that the magnetic moment of the free layer structure is less and therefore more responsive to lower field signals from the bits of the rotating magnetic disk. The thickness of the cobalt iron layer is preferably not reduced so that the aforementioned improved magnetoresistive coefficient dr/R is maintained. Unfortunately, when the thickness of the free layer structure is reduced the ratio of the cobalt iron free layer to the nickel iron free layer increases. This results in the free layer structure being more magnetically stiff and less responsive to signal fields from the rotating magnetic disk.

SUMMARY OF THE INVENTION

The present invention provides a free layer structure with a reduced stiffness or uniaxial anisotropy ($H_K$) by sputter depositing the free layer structure in a nitrogen atmosphere. The first free layer of cobalt iron (CoFe) is sputter deposited directly on a copper spacer layer in a nitrogen atmosphere and a second free layer, composed of nickel iron (NiFe), is sputter deposited directly on the first free layer in a nitrogen atmosphere. Before depositing the first free layer the copper spacer layer was exposed to oxygen which oxidized the surface of the copper spacer layer where the first free layer is sputter deposited. With a moderate partial pressure of nitrogen the uniaxial anisotropy ($H_K$) of the free layer structure was reduced by 17% as compared to forming the free layer structure without the nitrogen atmosphere. An aspect of the invention is that this improvement was obtained without lowering the magnetoresistive coefficient dr/R. In fact, the magnetoresistive coefficient dr/R increased.

An object of the present invention is to provide a method of making a free layer structure of a spin valve sensor with reduced uniaxial anisotropy ($H_K$) without degrading the magnetoresistive coefficient dr/R of the sensor.

Another object is to provide the aforementioned sensor made according to the method of the invention.

Other objects and attendant advantages of the invention will be appreciated upon reading the following description taken together with the accompanying drawings.

DESCRIPTION OF THE PREFERRED EMBODIMENTS

Magnetic Disk Drive

Figure 1:
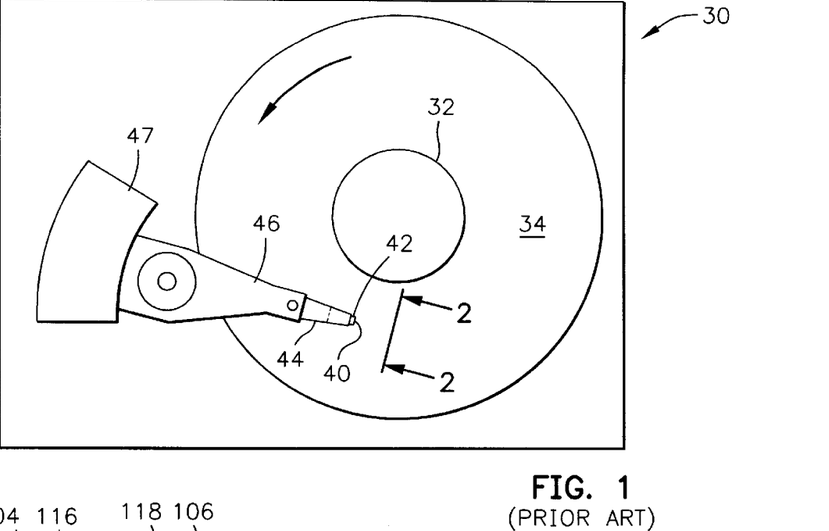
FIG. 1 is a plan view of a magnetic disk drive.
Figure 2:
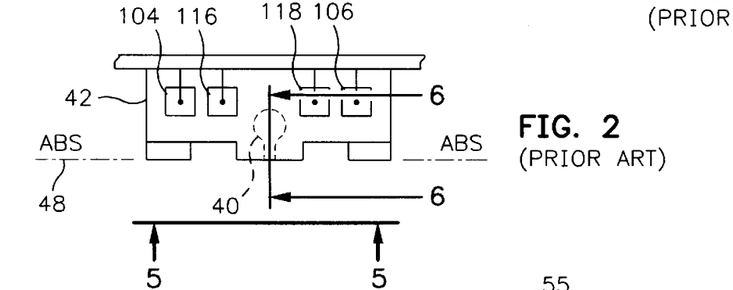
FIG. 2 is an end view of a slider with a magnetic head of the disk drive as seen in plane 2—2 of FIG. 1.
Figure 3:
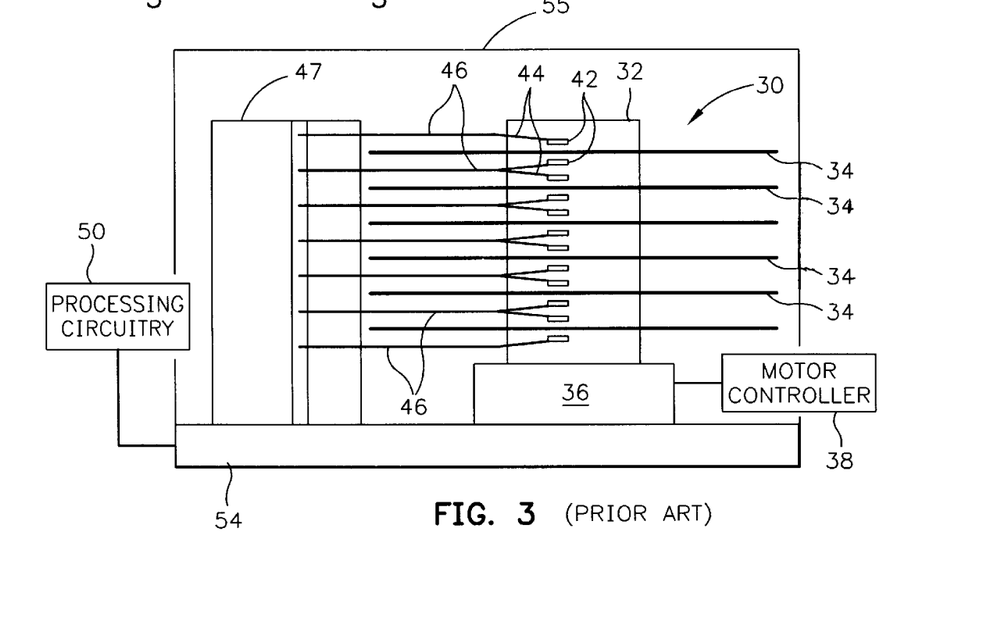
FIG. 3 is an elevation view of the magnetic disk drive wherein multiple disks and magnetic heads are employed.
Figure 4:
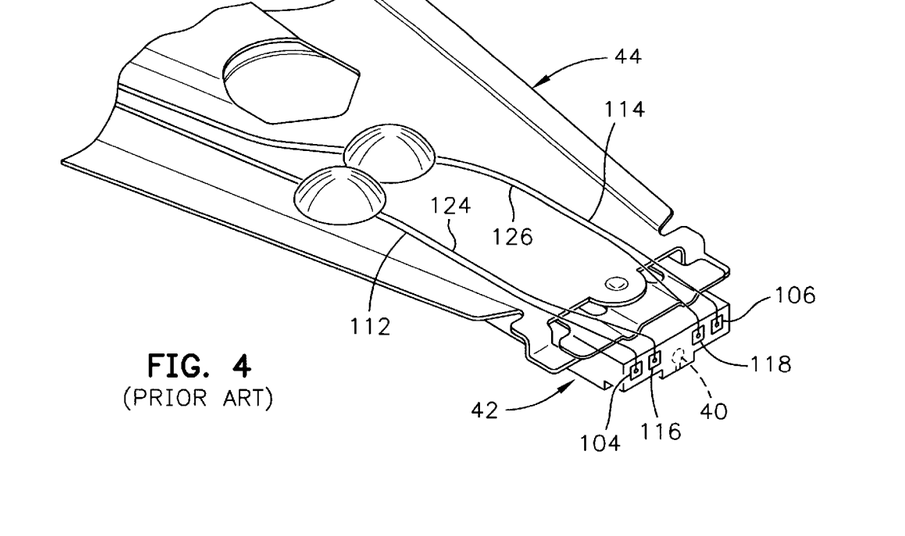
FIG. 4 is an isometric illustration of a suspension system for supporting the slider and magnetic head.

Referring now to the drawings wherein like reference numerals designate like or similar parts throughout the several views, FIGS. 1–3 illustrate a magnetic disk drive 30. The drive 30 includes a spindle 32 that supports and rotates a magnetic disk 34. The spindle 32 is rotated by a spindle motor 36 that is controlled by a motor controller 38. A slider 42 has a combined read and write magnetic head 40 and is supported by a suspension 44 and actuator arm 46 that is rotatably positioned by an actuator 47. A plurality of disks, sliders and suspensions may be employed in a large capacity direct access storage device (DASD) as shown in FIG. 3. The suspension 44 and actuator arm 46 are moved by the actuator 47 to position the slider 42 SO that the magnetic head 40 is in a transducing relationship with a surface of the magnetic disk 34. When the disk 34 is rotated by the spindle motor 36 the slider is supported on a thin (typically, 0.05 $\mu$m) cushion of air (air bearing) between the surface of the disk 34 and the air bearing surface (ABS) 48. The magnetic head 40 may then be employed for writing information to multiple circular tracks on the surface of the disk 34, as well as for reading information therefrom. Processing circuitry 50 exchanges signals, representing such information, with the head 40, provides spindle motor drive signals for rotating the magnetic disk 34, and provides control signals to the actuator for moving the slider to various tracks. In FIG. 4 the slider 42 is shown mounted to a suspension 44. The components described hereinabove may be mounted on a frame 54 of a housing, as shown in FIG. 3.

Figure 5:
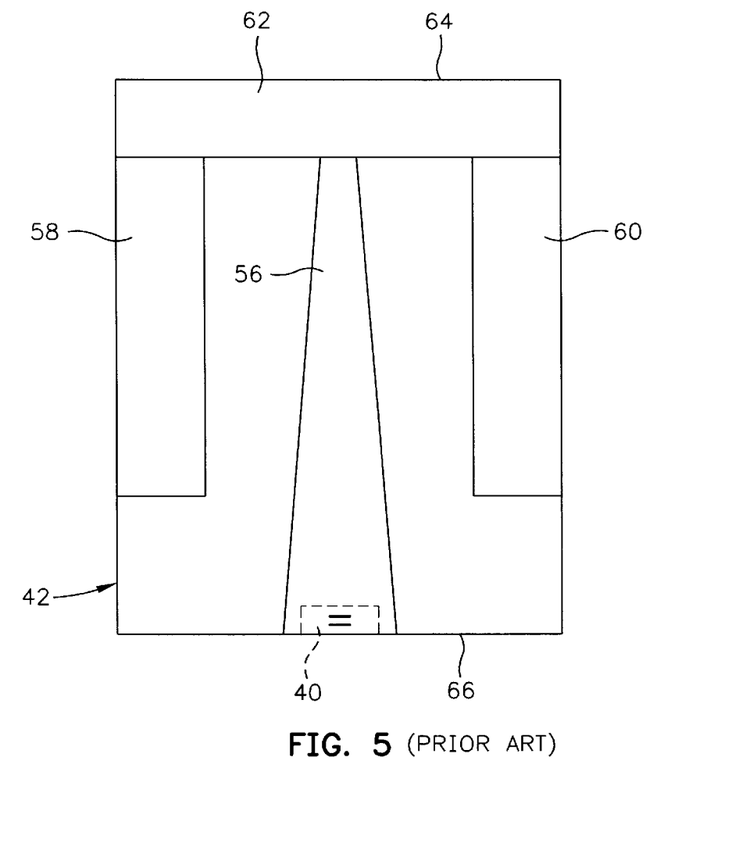
FIG. 5 is an ABS view of the magnetic head taken along plane 5—5 of FIG. 2.

FIG. 5 is an ABS view of the slider 42 and the magnetic head 40. The slider has a center rail 56 that supports the magnetic head 40, and side rails 58 and 60. The rails 56, 58 and 60 extend from a cross rail 62. With respect to rotation of the magnetic disk 34, the cross rail 62 is at a leading edge 64 of the slider and the magnetic head 40 is at a trailing edge 66 of the slider.

Figure 6:
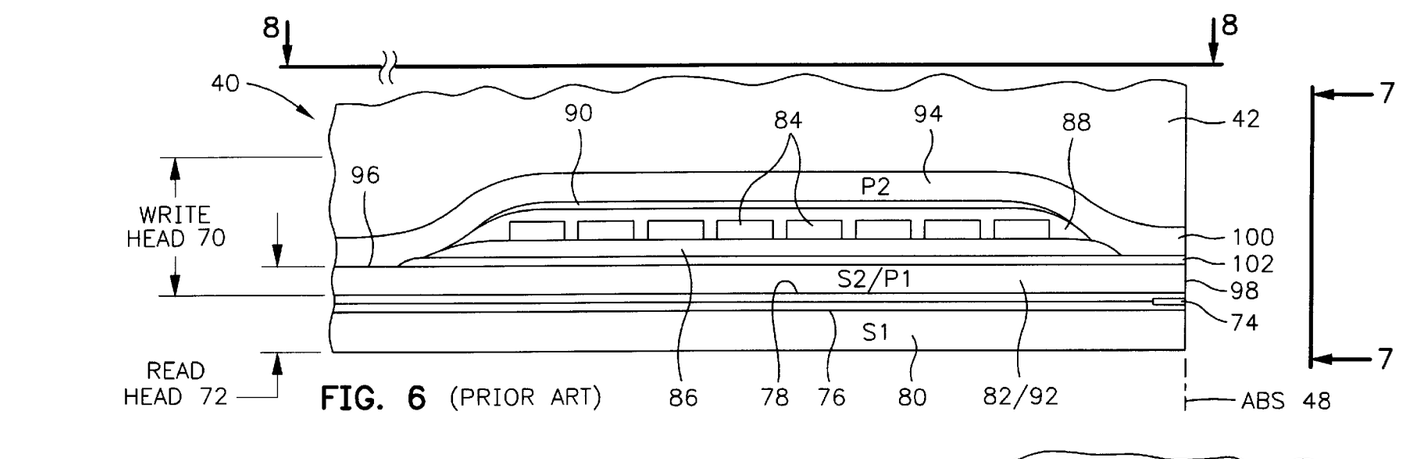
FIG. 6 is a partial view of the slider and a merged magnetic head as seen in plane 6—6 of FIG. 2.
Figure 7:
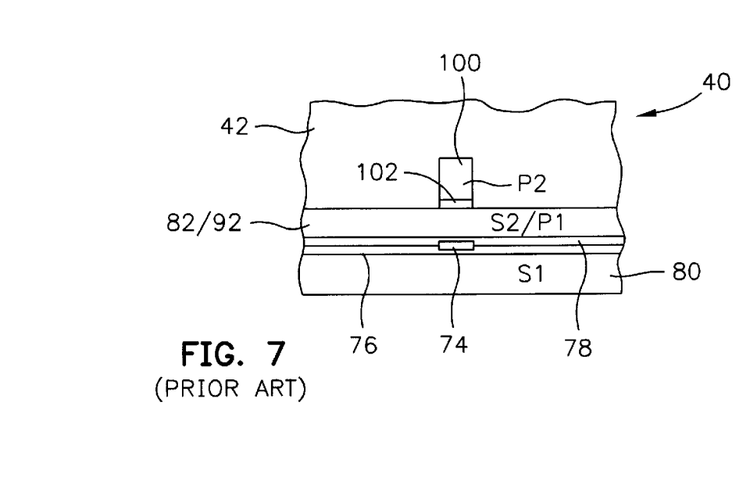
FIG. 7 is a partial ABS view of the slider taken along plane 7—7 of FIG. 6 to show the read and write elements of the merged magnetic head.

FIG. 6 is a side cross-sectional elevation view of a merged magnetic head 40, which includes a write head portion 70 and a read head portion 72, the read head portion employing a dual spin valve sensor 74 of the present invention. FIG. 7 is an ABS view of FIG. 6. The spin valve sensor 74 is sandwiched between nonmagnetic electrically insulative first and second read gap layers 76 and 78, and the read gap layers are sandwiched between ferromagnetic first and second shield layers 80 and 82. In response to external magnetic fields, the resistance of the spin valve sensor 74 changes. A sense current $I_S$ conducted through the sensor causes these resistance changes to be manifested as potential changes. These potential changes are then processed as readback signals by the processing circuitry 50 shown in FIG. 3.

Figure 8:
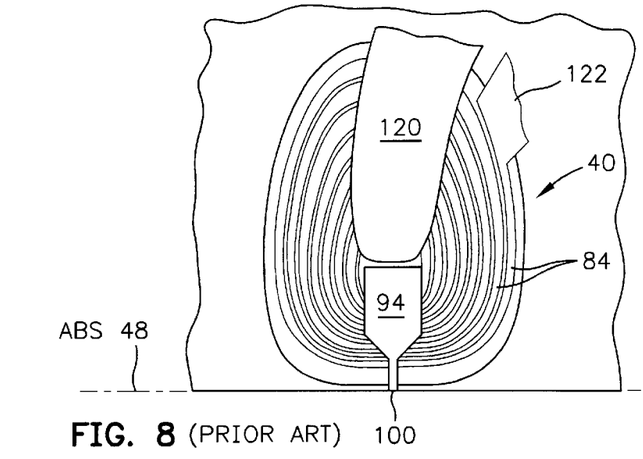
FIG. 8 is a view taken along plane 8—8 of FIG. 6 with all material above the coil layer and leads removed.

The write head portion 70 of the magnetic head 40 includes a coil layer 84 sandwiched between first and second insulation layers 86 and 88. A third insulation layer 90 may be employed for planarizing the head to eliminate ripples in the second insulation layer caused by the coil layer 84. The first, second and third insulation layers are referred to in the art as an "insulation stack". The coil layer 84 and the first, second and third insulation layers 86, 88 and 90 are sandwiched between first and second pole piece layers 92 and 94. The first and second pole piece layers 92 and 94 are magnetically coupled at a back gap 96 and have first and second pole tips 98 and 100 which are separated by a write gap layer 102 at the ABS. Since the second shield layer 82 and the first pole piece layer 92 are a common layer this head is known as a merged head. In a piggyback head the second shield layer and the first pole piece layer are separate layers which are separated by a nonmagnetic layer. As shown in FIGS. 2 and 4, first and second solder connections 104 and 106 connect leads from the spin valve sensor 74 to leads 112 and 114 on the suspension 44, and third and fourth solder connections 116 and 118 connect leads 120 and 122 from the coil 84 (see FIG. 8) to leads 124 and 126 on the suspension.

Figure 9:
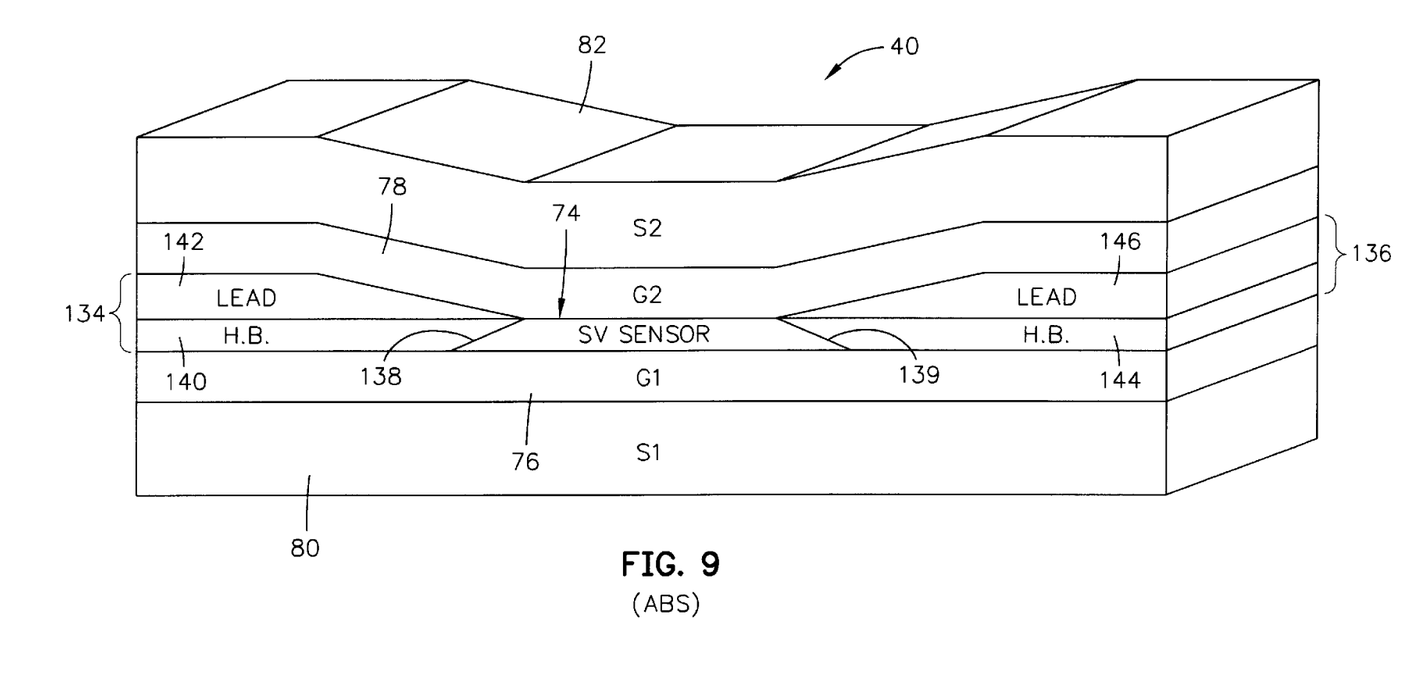
FIG. 9 is an enlarged isometric illustration of the read head with a spin valve sensor.

FIG. 9 is an isometric ABS illustration of the read head 40 shown in FIG. 6 or 7. The read head 40 includes the spin valve sensor 74. First and second hard bias and lead layers 134 and 136 are connected to first and second side edges 138 and 139 of the spin valve sensor. This connection is known in the art as a contiguous junction and is fully described in commonly assigned U.S. Pat. No. 5,018,037 which is incorporated by reference herein. The first hard bias and lead layers 134 include a first hard bias layer 140 and a first lead layer 142 and the second hard bias and lead layers 136 include a second hard bias layer 144 and a second lead layer 146. The hard bias layers 140 and 144 cause magnetic fields to extend longitudinally through the spin valve sensor 74 for stabilizing the magnetic domains therein. The spin valve sensor 74 and the first and second hard bias and lead layers 134 and 136 are located between the nonmagnetic electrically insulative first and second read gap layers 76 and 78. The first and second read gap layers 76 and 78 are, in turn, located between the ferromagnetic first and second shield layers 80 and 82.

Figure 10:
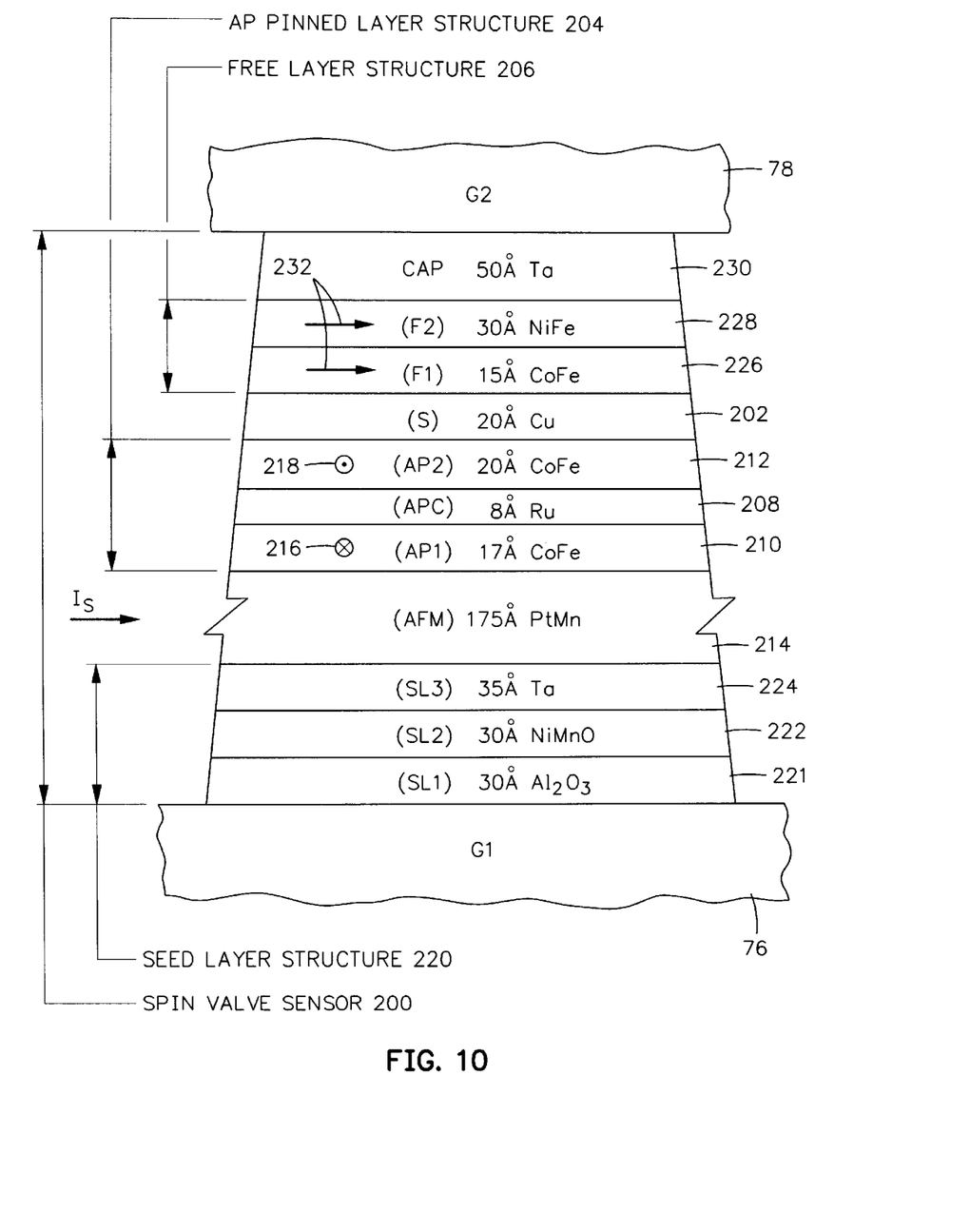
FIG. 10 is an ABS illustration of a spin valve sensor tested according to the present invention.

FIG. 10 is an ABS illustrations of a spin valve sensor 200 which was tested according to the present invention and will be discussed in detail hereinafter. The spin valve sensor 200 can be substituted for the spin valve sensor 74 shown in FIG. 9. In FIG. 10 the spin valve sensor 200 is shown between the first and second read gap layers 76 and 78. The spin valve sensor includes a nonmagnetic electrically nonconductive spacer layer (S) 202 which is located between an antiparallel (AP) pinned layer structure 204 and a free layer structure 206. The AP pinned layer structure 204 includes an antiparallel coupling (APC) layer 208 which is located between first and second antiparallel (AP) pinned layers (AP1) and (AP2) 210 and 212. The first AP pinned layer 210 is exchange coupled to an antiferromagnetic (AFM) pinning layer 214 which pins a magnetic moment 216 of the first AP pinned layer perpendicular to the ABS in a direction out of the sensor or into the sensor, as shown in FIG. 10. By a strong antiparallel coupling between the first and second AP pinned layers 210 and 212, a magnetic moment 218 of the second AP pinned layer is antiparallel to the magnetic moment 216. A seed layer structure 220 may be provided between the first read gap layer 76 and the pinning layer 214 for promoting a desirable microstructure of the layers deposited thereon. The seed layer structure 220 may include first, second and third seed layers (S1), (S2) and (S3) 221, 222 and 224, which will be discussed in more detail hereinafter.

The free layer structure preferably includes first and second free layers (F1) and (F2) 226 and 228. A cap layer 230 may be located on the free layer structure for protecting the spin valve sensor from subsequent processing steps. The free layer structure has a magnetic moment 232 which is oriented parallel to the ABS and to the major planes of the layers in a direction from right to left or from left to right, as shown in FIG. 10. When a signal field from the rotating magnetic disk rotates the magnetic moment 232 of the free layer into the sensor the magnetic moments 232 and 218 become more antiparallel which increases the resistance of the sensor to the sense current $I_S$, and when the signal field from the rotating magnetic disk rotates the magnetic moment 232 out of the sensor the magnetic moments 232 and 218 become more parallel which reduces the resistance of the sensor to the sense current $I_S$. These resistance changes are processed as playback signals by the processing circuitry 50 in FIG. 3.

The thicknesses and materials of the layers for the examples of the experiments, which will be discussed hereinafter, are 30 Å of aluminum oxide for the first seed layer 221, 30 Å of nickel manganese oxide for the second seed layer 222, 35 Å of tantalum for the third seed layer 224, 175 Å of platinum manganese for the pinning layer 214, 17 Å of cobalt iron for the first AP pinned layer 210, 8 Å of ruthenium for the antiparallel coupling layer 208, 20 Å of cobalt iron for the second AP pinned layer 212, 20 Å of copper for the spacer layer 202, 15 Å of cobalt iron for the first free layer 226, 30 Å of nickel iron for the second free layer 228 and 50 Å of tantalum for the cap layer 230.

In the following examples the ion beam sputtering system 400 in FIG. 11 was employed for sputter depositing the first and second free films 226 and 228 of the free layer structure in the presence of a nitrogen ($N_2$) atmosphere on the spacer layer 202. Located within a sputtering chamber 402 of the sputtering system is a substrate 404 upon which layers 406 of the spin valve sensor 200 below the first free layer 226 have been formed. Also located within the chamber are cobalt iron ($Co_{90}Fe_{10}$) and nickel iron ($Ni_{83}Fe_{17}$) targets 408 and 409. An ion beam (IB) gun 410 projects through the chamber 402 and accelerates xenon (Xe) ions to the targets in sequence which causes cobalt iron (CoFe) and then nickel iron (NiFe) to be sputtered from the targets onto the substrate 404. Simultaneously, nitrogen ($N_2$) is introduced through an opening 412 into the chamber so that the nitrogen reacts first with the cobalt iron and then with the nickel iron to form the first and second free layers 226 and 228. The partial pressure of the nitrogen ($N_2$) within the chamber was $2 \times 10^{-5}$ Torr.

EXAMPLE 1

Figure 11:
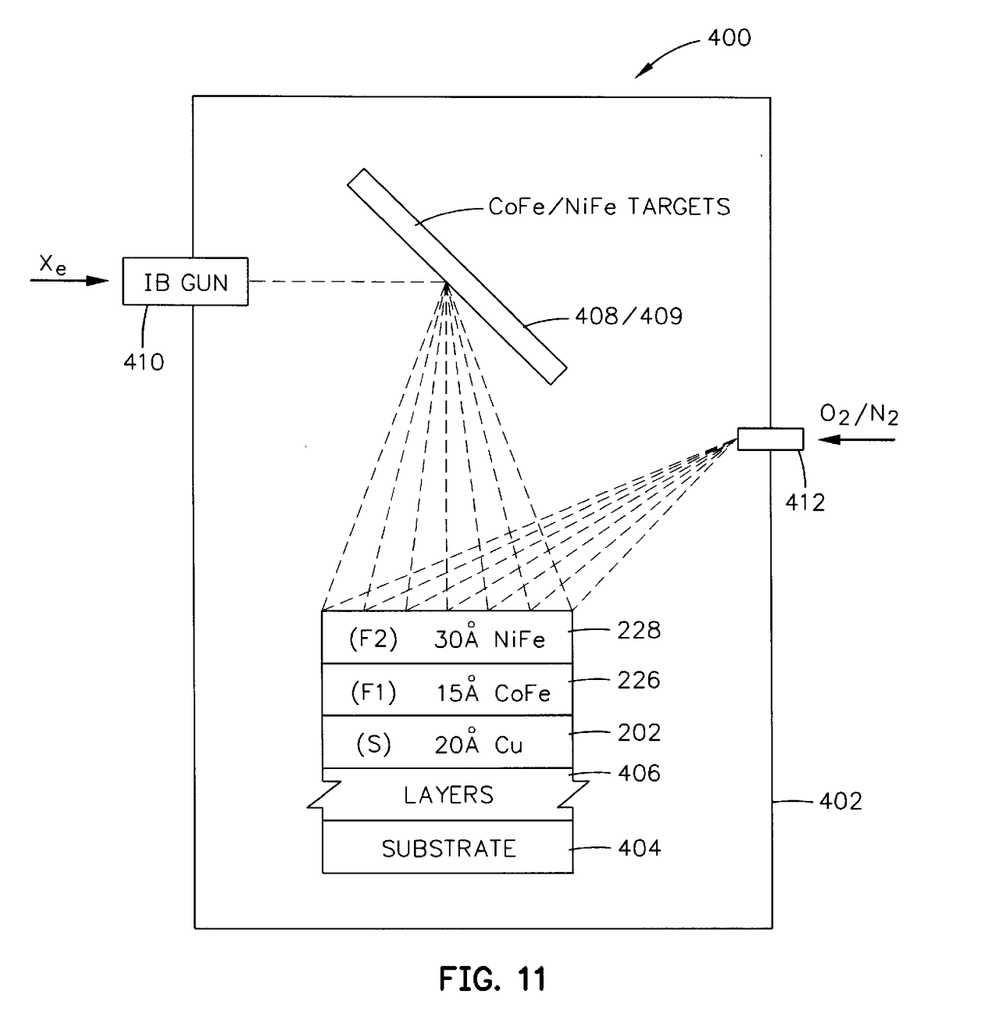
FIG. 11 is a schematic illustration of an ion beam sputtering system employed in practicing the invention.

In this example the spin valve sensor 200 in FIG. 10 was tested after depositing the first and second free layers 226 and 228, as shown in FIG. 11, in the sputtering chamber without any nitrogen atmosphere. The uniaxial anisotropy ($H_K$) was 7.25 Oe and the magnetoresistive coefficient dr/R was 7.86%. The resistance R was 21.8 ohms sq and the easy axis coercivity ($H_C$) was 6.75 Oe.

EXAMPLE 2

In this example a nitrogen atmosphere was employed in the sputtering chamber in FIG. 11 with the nitrogen gas ($N_2$) being introduced through the opening 412 during the sputtering of the targets 408 and 409 by the ion beam gun 410. Before forming the first and second free layers 226 and 228 the copper spacer layer 202 was exposed to oxygen ($O_2$) through the opening 412 after its formation so the top surface of the spacer layer was copper oxide (CuO). Next a cobalt iron ($Co_{90}Fe_{10}$) target 408 was employed and sputtered by the ion beam gun 410 simultaneously with the introduction of nitrogen ($N_2$) through the opening 412 with a flow rate of 2 standard cubic centimeter per minute (sccm). After formation of the first free layer 226 the nickel iron ($Ni_{83}Fe_{17}$) target 409 was sputter deposited by the ion beam gun 410 and nitrogen ($N_2$) was introduced through the opening 412 to form the second free layer 228 directly on the first free layer 226. After completing the spin valve sensor 200 in FIG. 10 it was tested and the uniaxial anisotropy ($H_K$)

was found to be 8.4 Oe and the magnetoresistive coefficient dr/R was found to be 7.84%. The resistance R was 21.8 ohms sq and the easy axis coercivity ($H_C$) was 6.05 Oe.

EXAMPLE 3

This example is the same as Example 2 except the flow rate of the nitrogen was 3 sccm. After completing the sensor 200 in FIG. 10 it was tested and it was found that the uniaxial anisotropy ($H_K$) was 6.4 Oe and the magnetoresistive coefficient dr/R was 7.9%. The resistance R of the sensor was 21.8 ohms sq and the easy axis coercivity ($H_C$) was 6.25 Oe.

EXAMPLE 4

This example is the same as Example 2 except the flow of nitrogen was 4 sccm. After completing the sensor 200 in FIG. 10 it was tested and the uniaxial anisotropy ($H_K$) was found to be 7.3 Oe and the magnetoresistive coefficient dr/R was 7.95%. The resistance R was 21.9 ohms sq and the easy axis coercivity ($H_C$) was 6.3 Oe.

EXAMPLE 5

This example is the same as Example 2 except the flow of nitrogen was 6 sccm. After completing the sensor 200 in FIG. 10 it was tested and the uniaxial anisotropy ($H_K$) was found to be 6.0 Oe and the magnetoresistive coefficient dr/R was 7.95%. The resistance R was 21.9 ohms sq and the easy axis coercivity ($H_C$) was 5.85 Oe.

Discussion

It can be seen from the above examples that Example 5 provides the best results in that the uniaxial anisotropy ($H_K$), in Example 1, of 7.25 Oe was reduced to 6.0 Oe and the magnetoresistive coefficient dr/R was increased from 7.86% to 7.95%. In Examples 2 to 5 the partial pressure of the nitrogen gas in the chamber can range from $2 \times 10^{-5}$ to $1 \times 10^{-4}$ Torr. In all examples, the first free layer 226 was cobalt iron ($Co_{90}Fe_{10}$) and the second free layer 228 was nickel iron ($Ni_{83}Fe_{17}$). In a broad concept of the invention these compositions may change and it should be understood that cobalt or a cobalt based material may be substituted for cobalt iron. The invention also includes the product made and its use in the magnetic head in FIG. 6 and the disk drive in FIGS. 1 to 3.

The present invention may be used in either a single or a dual spin valve sensor. In a dual spin valve sensor the free layer structure preferably has a nickel iron layer between a pair of cobalt iron layers. In this example all these layers of the free layer structure are sputter deposited in a nitrogen atmosphere. While it is preferred that the free layer structure include at least first and second free layers composed of cobalt iron and nickel iron, respectively, it should be understood that a single cobalt iron free layer may be employed for the free layer structure without departing from the spirit of the invention.

Further, it should be understood that the nitrogen ($N_2$) atmosphere changes the microstructure (grain size) of the free layer structure by interstitially introducing nitrogen between the atoms of the thin film or thin films. The cobalt iron or nickel iron has a changed crystalline structure which reduces the uniaxial anisotropy ($H_K$) of the free layer structure.

Clearly, other embodiments and modifications of this invention will occur readily to those of ordinary skill in the art in view of these teachings. Therefore, this invention is to be limited only by the following claims, which include all such embodiments and modifications when viewed in conjunction with the above specification and accompanying drawings.

I claim:

1. A method of making a magnetic read head, comprising the steps of:
   a making a spin valve sensor comprising the steps of:
      forming a ferromagnetic pinned layer structure that has a magnetic moment;
      forming a pinning layer exchange coupled to the pinned layer structure for pinning the magnetic moment of the pinned layer structure;
      forming a free layer structure;
      forming a nonmagnetic electrically conductive spacer layer between the free layer and the pinned layer structure; and
      the forming of the free layer structure comprising the step of sputter depositing a first free layer composed of cobalt iron directly on the spacer layer in a nitrogen atmosphere.

2. A method as claimed in claim 1 including:
   forming nonmagnetic electrically nonconductive first and second read gap layers;
   forming the spin valve sensor between the first and second read gap layers;
   forming ferromagnetic first and second shield layers; and
   forming the first and second read gap layers between the first and second shield layers.

3. A method as claimed in claim 2 wherein the forming of the free layer structure further includes the step of sputter depositing a second free layer composed of nickel iron directly on the first free layer in a nitrogen atmosphere.

4. A method of making a magnetic read head, comprising the steps of:
   a making a spin valve sensor comprising the steps of:
      forming a ferromagnetic pinned layer structure that has a magnetic moment;
      forming a pinning layer exchange coupled to the pinned layer structure for pinning the magnetic moment of the pinned layer structure;
      forming a free layer structure;
      forming a nonmagnetic electrically conductive spacer layer between the free layer structure and the pinned layer structure; and
      the forming of the free layer structure comprising the step of sputter depositing a first free layer composed of cobalt iron directly on the spacer layer in a nitrogen atmosphere wherein a partial pressure of the nitrogen atmosphere is from $2 \times 10^{-5}$ Torr to $1 \times 10^{-4}$ Torr.

5. A method as claimed in claim 4 wherein the first free layer is formed of cobalt iron ($Co_{90}Fe_{10}$) and the second free layer is formed of nickel iron ($Ni_{83}Fe_{17}$).

6. A method as claimed in claim 5 further including the steps of:
   forming the spacer layer of copper; and
   after forming the spacer layer but before forming the first free layer exposing the spacer layer to an oxygen atmosphere.

7. A method as claimed in claim 6 wherein a forming of the pinned layer structure comprises the steps of:
   forming ferromagnetic first and second antiparallel (AP) pinned layers with the first AP layer interfacing the pinning layer; and forming an antiparallel (AP) coupling layer between the first and second AP pinned layers.

8. A method of making magnetic head assembly that has an air bearing surface (ABS), comprising the steps of:
    making a write head including the steps of:
        forming ferromagnetic first and second pole piece layers in pole tip, yoke and back gap regions wherein the yoke region is located between the pole tip and back gap regions;
        forming a nonmagnetic electrically nonconductive write gap layer between the first and second pole piece layers in the pole tip region;
        forming an insulation stack with at least one coil layer embedded therein between the first and second pole piece layers in the yoke region; and
        connecting the first and pole piece layers at said back gap region; and
    making a read head including the steps of:
        forming nonmagnetic electrically nonconductive first and second read gap layers;
        forming a spin valve sensor between the first and second read gap layers;
        forming the first and second read gap layers between the first shield layer and the first pole piece layer; and
    a making of the spin valve sensor comprising the steps of:
        forming a ferromagnetic pinned layer structure that has a magnetic moment;
        forming a pinning layer exchange coupled to the pinned layer structure for pinning the magnetic moment of the pinned layer structure;
        forming a free layer structure;
        forming a nonmagnetic electrically conductive spacer layer between the free layer and the pinned layer structure; and
        the forming of the free layer structure comprising the step of sputter depositing a first free layer composed of cobalt iron directly on the spacer layer in a nitrogen atmosphere.

9. A method as claimed in claim 8 wherein the forming of the free layer structure further includes the step of sputter depositing a second free layer composed of nickel iron directly on the first free layer in a nitrogen atmosphere.

10. A method of making magnetic head assembly that has an air bearing surface (ABS), comprising the steps of:
    making a write head including the steps of:
        forming ferromagnetic first and second pole piece layers in pole tip, yoke and back gap regions wherein the yoke region is located between the pole tip and back gap regions;
        forming a nonmagnetic electrically nonconductive write gap layer between the first and second pole piece layers in the pole tip region;
        forming an insulation stack with at least one coil layer embedded therein between the first and second pole piece layers in the yoke region; and
        connecting the first and pole piece layers at said back gap region; and
    making a read head including the steps of:
        forming nonmagnetic electrically nonconductive first and second read gap layers;
        forming a spin valve sensor between the first and second read gap layers;
        forming the first and second read gap layers between the first shield layer and the first pole piece layer; and
    a making of the spin valve sensor comprising the steps of:
        forming a ferromagnetic pinned layer structure that has a magnetic moment;
        forming a pinning layer exchange coupled to the pinned layer structure for pinning the magnetic moment of the pinned layer structure;
        forming a free layer structure;
        forming a nonmagnetic electrically conductive spacer layer between the free layer structure and the pinned layer structure;
        the forming of the free layer structure comprising the step of sputter depositing a first free layer composed of cobalt iron directly on the spacer layer in a nitrogen atmosphere and sputter depositing a second free layer composed of nickel iron directly on the first free layer in a nitrogen atmosphere; and
        a partial pressure of each nitrogen atmosphere being from $2 \times 10^{-5}$ Torr to $1 \times 10^{-4}$ Torr.

11. A method as claimed in claim 10 wherein the first free layer is formed of cobalt iron ($Co_{90}Fe_{10}$) and the second free layer is formed of nickel iron ($Ni_{83}Fe_{17}$).

12. A method as claimed in claim 11 further including the steps of:
    forming the spacer of copper; and
    after forming the spacer layer but before forming the first free layer exposing the spacer layer to an oxygen atmosphere.

13. A method as claimed in claim 12 wherein a forming of the pinned layer structure comprises the steps of:
    forming ferromagnetic first and second antiparallel (AP) pinned layers with the first AP layer interfacing the pinning layer; and
    forming an antiparallel (AP) coupling layer between the first and second AP pinned layers.

* * * * *